United States Patent Office 3,475,391
Patented Oct. 28, 1969

3,475,391
HYDROXYLATED TETRAFLUOROETHYLENE/ISOBUTYLENE POLYMERS AND THEIR PREPARATION
James N. Coker, Wilmington, Del., assignor to E. I. du Pont de Nemours and Company, Wilmington, Del., a corporation of Delaware
No Drawing. Filed Feb. 28, 1967, Ser. No. 619,185
Int. Cl. C08f *15/40, 15/06*
U.S. Cl. 260—80.8                19 Claims

ABSTRACT OF THE DISCLOSURE

Tetrafluoroethylene/isobutylene polymers containing hydroxyl groups and approximately equimolar amounts of each monomer are obtained by contacting isobutylene and 0.5 to 2.5 moles of tetrafluoroethylene per mole of isobutylene, alone or together with small amounts of other monomers, e.g., acrylic acid, at 50–120° C. and 20–50 atmospheres, in agitated aqueous media containing an emulsifier, a persulfate initiator, a sulfite or bisulfite reducing agent, a copper accelerator, a phosphate regulator, and preferably a chain transfer agent. Carboxylated species are stabilized with cationic metal bases.

BACKGROUND

Tetrafluoroethylene/isobutylene polymers and their preparation in aqueous t-butanol with organic peroxide initiators, at space time yields of up to about 150 grams per liter of reaction medium per hour are disclosed in U.S. Patent 2,468,664 and in the copending applications of F. B. Stilmar, U.S. Ser. No. 407,856, now U.S. Patent Ser. No. 3,380,974, filed Oct. 30, 1964, and W. R. Brasen et al., U.S. Ser. No. 577,799, filed Sept. 8, 1966. In the Stilmar application it is disclosed that polymers critically containing 53–67 weight percent tetrafluoroethylene and 32–44 weight percent isobutylene are highly attractive as polymeric binders, especially when containing 0.01 to 12 weight percent of an acidic or acidogenic comonomer such as acrylic acid or ester. Use of the t-butanol reaction system with organic peroxide initiators affords the special advantages of visual homogeneity associated with a copolymer having a substantially alternating rather than a substantially consecutive arrangement of like monomer units in the molecule. However, the product is obtained in a thick gelatinous form which is difficult to handle.

SUMMARY

According to the present invention it has been found that tetrafluoroethylene/isobutylene polymers which are visually homogeneous and attractive as polymeric binders can be produced as fluid aqueous dispersions at space time yields of up to several hundred grams per hour per liter of reaction medium by contacting isobutylene and 0.5 to 2.5 moles of tetrafluoroethylene per mole of isobutylene at 50–120° C. and 20–50 atmospheres with an agitated aqueous medium containing an emulsifier for isobutylene, a persulfate initiator, a sulfite or bisulfite forming a redox system with said persulfate, a copper accelerator for said redox system, and a phosphate regulator for said system.

According to the present invention there have further been found attractive polymeric binders having a melt index in the range of 1–4000 which are visually homogeneous, contain 53–67 weight percent tetrafluoroethylene, 32–44 weight percent isobutylene, and 0–14 weight percent complementally of other monomer, optionally including an acidic or acidogenic monomer such as acrylic acid or ester, and differing from previously reported polymers of generally similar constitution in that they contain hydroxyl groups so as to be postcurable by heating either together with compatible polycarboxylated polymers, or alone or together with other curing aids when containing carboxyl groups as part of the polymer molecule. The "compatible" polymers are wet by and nonvolatile in the molten hydroxylated polymer.

In accordance with the present invention there have further been found cationic metal salt derivatives of the above-identified self-curable carboxylated polymers which have a stable melt index and at the same time, good adhesion to metallic substrates.

DETAILED DESCRIPTION

The polymerization may be carried out in conventional emulsion polymerization equipment by batch techniques, but is preferably carried out in a semicontinuous manner, the purged oxygen-free reactor being initially charged with the prescribed reaction medium and thereafter the medium continuously agitated, heated and pressured with the monomer mixture until a dispersion of the desired concentration is produced, after which the pressuring is stopped and the reactor contents discharged.

An operating temperature in the range of 50–120° C. is indicated with a preferred range of 80–95° C. In general, as temperature is increased, the reaction rate, the tetrafluoroethylene content of the polymer, and the melt index of the polymer tend to increase. At temperatures below about 50° C. the reaction rate tends to be unacceptably low, and above about 120° C., it becomes difficult to produce the desired visually homogeneous polymer.

An operating pressure of 20 to 50 atmospheres is indicated, with a preferred range of 30–45 atmospheres. In general, as pressure is increased, the reaction rate and the tetrafluoroethylene content tend to increase and the melt index of the polymer tends to decrease. At pressures below about 20 atmospheres the reaction rate tends to be unacceptably low, and at pressures above 50 atmospheres, it is difficult to handle the tetrafluoroethylene.

In order to obtain the desired polymers it is essential that the tetrafluoroethylene/isobutylene mole ratio in the reactor be at least 0.5 and not greater than about 2.5 at the onset or "kickoff" of the polymerization reaction. Onset of polymerization is deemed to occur when it becomes necessary to feed additional material in order to avoid a pressure drop in the reactor. At higher mole ratios at onset, nonhomogeneous polymers having a high TFE content tend to form and subsequent decrease of the mole ratio stops the reaction. At lower mole ratios at onset, sticky low-melting isobutylene-rich polymers tend to form.

It has been found that the mole ratio of tetrafluoroethylene to isobutylene at the onset of polymerization must be greater than 1.0 in order to achieve maximum reaction rates, and is preferably 1.4 to 2.0 in order to achieve maximum productivity to desired polymer. A ratio this high at onset does not result in nonhomogeneous polymer.

On the other hand, if the high ratio is thereafter maintained until dipolymer or neutral polypolymer (of three or more monomers) dispersion containing more than about 20 percent solids is produced, as is usually preferable, an undesirable product containing more than about 50 mole percent tetrafluoroethylene tends to result, since the tendency of the tetrafluoroethylene to enter into the reaction tends to increase as the reaction proceeds.

Further, if the high ratio is continued for even a short time after onset of a polymerization involving an acidic monomer, it has been found, the high initial reaction rate is quickly lost and the ensuing slow reaction tends to produce nonhomogeneous polymer. Possibly this results from a tendency for the acidic monomer to polarize the surface of the emulsified isobutylene, thus decreasing the effective availability of isobutylene relative to tetrafluoroethylene. At any rate, the slowing tendency can be and preferably is avoided by lowering the mole ratio of tetrafluoroethylene to isobutylene in the charge fed to the reaction after the onset of polymerization.

Desirably, therefore, the mole ratio of tetrafluoroethylene to isobutylene charged to the reactor after the onset of polymerization will be reduced, and preferably by an amount such that the mole ratio of tetrafluoroethylene to isobutylene in the reactor averages 0.90 to 1.10 over the course of the entire polymerization, particularly in preparing acidic terpolymer dispersions or dipolymer dispersions of more than about 20 percent solids. The average ratio over the course of the entire polymerization is taken as the ratio of total moles of tetrafluoroethylene and isobutylene charged to the reactor. The ratio of monomers preferably charged after the onset of polymerization may thus bebelow 1.0, and is commonly 0.8 to 0.95. Surprisingly, the benefit of the initially high reaction rate has been found to persist over the course of the reaction, even after the initial high mole ratio of tetrafluoroethylene to isobutylene has been reduced.

In preparing polymers containing other monomers and particularly acidic monomers in addition to tetrafluoroethylene and isobutylene, it is essential to maximum reaction rate consistent with obtaining the desired tetrafluoroethylene/isobutylene polymers that the other monomer may be added after the onset of polymerization. In general, any ethylenically unsaturated monomer copolymerizable with tetrafluoroethylene or isobutylene may be employed, typical examples being vinyl ethers such as perfluoro(methyl vinyl)ether, methyl trifluorovinyl ether, chloroethyl vinyl ether, vinyl ester such as vinyl acetate and vinyl benzoate, as well as such monomers as vinyl fluoride, propylene, hexafluoropropylene, t-butyl acrylate, and acrylic acid, and monomers listed in the references mentioned hereinbefore.

The amounts of other monomer added to the reaction will be in the range of 0-14 weight percent of the total monomers. The general effect of the added other monomers is to increase the solubility of the product in various solvents, to provide additional sites for crosslinking, and, in the case of acidic or acidogenic monomers, to increase the adherability of the products to various substrates. Acrylic acid in amounts of 0.5 to 5 weight percent of the total monomers is a preferred additional monomer.

Usually maximum reaction rate is achieved when the pH of the reaction medium is in the range of 6-8, although the system is operable over a wide pH range, e.g., 1.5 to 10. However, when it is desired to incorporate ionizable monomers such as acrylic acid, it has been found necessary to employ acidic systems having a pH of 5 or less and preferably 2.0 to 4.0 in order to obtain polymer containing the preferred amounts of combined acrylic acid. The pH of the reaction medium is controlled by selection of the phosphate regulators, and generally decreases as the reaction proceeds.

The presence of an emulsifier for the isobutylene which is effective under the reaction conditions is a further essential to obtaining polymers of the desired constitution and visual homogeneity. Any of a large number of known emulsifiers can be used, including cationic, nonionic and anionic types, but the anionic types are preferred as permitting stable dispersions of maximum polymer solids to be prepared. Of the anionic types, the ammonium salts of halogenated organic acids, and the alkali metal alkyl sulfates, each of 8 to 18 carbon atoms per molecule, and particularly sodium tetradecyl sulfate are preferred.

In general, the reaction rate increases with the concentration of the emulsifier up to the critical micelle concentration, and the emulsifier concentration is preferably 1 to 1.5 times the critical micelle concentration. The critical micelle concentration for purposes here is taken as the concentration at which a plot of surface tension vs. concentration in water at ambient temperature undergoes a sharp change of slope. Usually, the amounts of emulsifier are in the range of 2–50 grams per liter of reaction medium.

The polymerization is carried out in the presence of a persulfate initiator, such as ammonium or alkali metal persulfate, and a sulfate or bisulfite forming a redox system with the persulfate. The charge will contain generall 0.1 to 50 and preferably 1 to 10 grams of persulfate ion per liter of reaction medium, and generally 0.05 to 2 and preferably 0.1 to 0.3 gram of sulfite and/or bisulfite ion per gram of persulfate. Variation in the amount of the persulfate initiator, so long as present in polymerization-initiating amounts, generally does not greatly affect either the reaction rate or the melt index of the final product, and very small amounts can be used to provide effective reaction rate by charging the initiator to the reaction mixture continuously as the reaction proceeds. The preferred amounts of sulfite or bisulfite provide maximum acceleration of the persulfate system. Higher loadings do not appear to provide added benefit. The sulfite and bisulfite are interconvertible by a reversible reaction governed by the pH of the reaction medium.

The reaction is carried out in the further presence of accelerating amounts of copper, which necessarily involves very small amounts, on the order of 0.02 to 2 milligrams, of dissolved copper ion per liter of reaction medium. Any water-soluble copper salt may be employed. Copper sulfate is preferred. Amounts of copper substantially larger than about 2 milligrams per liter cause inhibition of the desired reaction.

The reaction is further carried out in the presence of a phosphate regulator. Any of a wide variety of water-soluble phosphate compounds may be employed, including phosphoric acid, mono-, di- or tri-basic phosphates, metaphosphates, polyphosphates, citrophosphates and the like. The total number of moles of phosphate ion will generally be 0.5 to 5 times the total number of moles of persulfate, sulfite and bisulfite charged to the reaction medium. Lesser amounts lead to premature termination of the reaction, and larger amounts provide no added benefit.

The combination of the four above-listed components has been found essential to achieving maximum reaction rate in the production of the desired polymers while minimizing discoloration thereof. In order to control the melt index of the polymer without altering the desired polymer constitution, it is preferable to employ a chain transfer agent for the reaction. Any compound which contains a sufficiently labile hydrogen or hydrocarbon radical can be employed. Preferred agents, however, are the alkyl benzenes, such as ethyl, isopropyl and diisopropyl benzenes and aliphatic aldehydes such as butyraldehyde, isovaleraldehyde and the like. In order to produce a melt index in the preferred range of 5 to 100, amounts in the range of 1 to 10 grams per liter of reaction medium aer usually employed.

The reaction is preferably continued until the liquid medium contains 20 to 40 percent solids. The reaction is terminated by decreasing the pressure, temperature and agitation rate. The products are obtained in the form of aqueous colloidal dispersions which are extremely stable and may be used as such or coagulated by freezing or salting out to provide free-flowing polymer granules. Visual homogeneity is determined on film obtained by melt pressing the washed granules. The visually homogeneous polymers sohw no haze.

The products obtained by the process of the invention differ from corresponding prior art polymers in containing hydroxyl groups. Presence of hydroxyl groups is indicated by characteristic absorption of molded films of the polymer in the infrared at 2.75 microns wave length, by the curing of the polymer to products of lower melt index on being heated in uniform admixture with compatible polycarboxylic acids under the conditions of the melt index test or, in the case of polymers containing carboxyl groups, by spontaneous curing on such heating. Melt index, as referred to herein, is determined by the extrusion procedure of ASTM D–1238, at a temperature of 230° C., using a 3800 gram weight and a stainless steel discharge orifice having a diameter of 0.208 centimeter and a land length of 0.903 centimeter, and allowing exactly 5 minutes, or other time specified, for the sample to come to temperature.

Typically, the products of the invention have a glass transition temperature in the range of ca. 15 to 55° C. and a crystalline melting point in the range of 110–190° C. Carboxylated polymers generally show values in the lower ranges. Surprisingly, when prepared in the presence of chain transfer agent, however, they reliably have a narrower range of glass transitions of 35–55° C. and crystalline melting points of 150–186° C., and provide superior results in most polymeric binder applications.

The polymers which contain both hydroxyl groups and carboxyl groups and are spontaneously curable, so as to decrease in melt index on being heated under the conditions of the melt index test, may be altered in their tendency to cure by reacting the carboxylic acid group with a cationic metal base. Any cationic metal compound which is a base or a salt of a weak acid so as to be reactive with the carboxylic acid group of the polymer may be employed. Cationic metal acetates and alcoholates are preferred. In general, the effectiveness of the cationic metal compound increases with increasing basicity of the cationic metal and with increasing valence of the cationic metal. Polyvalent metals and particularly calcium are preferred.

Surprisingly, it is not necessary to neutralize all of the carboxylic acid in order to achieve a product of stable melt index. Amounts adequate to neutralize 10–75 percent of the carboxyl groups in the polymer are effective, depending on the cationic metal, and when so used provide a melt stable product which nevertheless manifests improved adhesion to substrate metals as compared with the corresponding uncarboxylated or fully neutralized carboxylated tetrafluoroethylene/isobutylene polymers.

The invention is more particularly described and explained by means of the following illustrative and comparative examples in which, except as otherwise stated, all parts and percentages are by weight; all water employed as a reaction medium is distilled demineralized deoxygenated water; all space time yields are expressed in grams per hour per liter of water or water/alcohol reaction medium initially charged; all percentages of combined acrylic acid in the products are based on titration of hot perchloroethylene solutions to a permanent pink phenolphthalein end-point with alcoholic NaOH; all mole percentages of combined tetrafluoroethylene in the products are based on analyses of the product for fluorine and for other elements or groups characteristic of any monomers used other than isobutylene and tetrafluoroethylene; all melt indexes and visual homogeneities are determined by the procedures hereinbefore mentioned; all curing rates are determined by measuring an original melt index ($MI_0$) and melt index ($MI$) after holding the sample at temperature in the indexer for time $t$ equal to one hour, and expressed in reciprocal hours, as the value A in the equation $MI_0 = MI^{-At}$; all glass transition and crystalline melting points are determined by differential thermal analysis; and all absorptions in the infrared are determined on molded films of the polymer.

Example I

This comparative example summarizes results obtained with t-butanol reaction media and organic peroxide initiator in a series of experiments.

Into a nitrogen-filled water-steam jacketed stirred stainless steel autoclave having a water capacity of ca. 7500 parts were charged 2000–2500 parts by volume (1560–1950 parts by weight) t-butanol, 2000–2500 parts water, 2100–2500 total parts of tetrafluoroethylene/isobutylene mixture in mole ratio of from ca. 0.7:1 to 2:1, 4–5 parts of benzoyl peroxide, and 0–3 parts ammonium perflourocaprylate.

The autoclave was closed and heated with stirring to 80–85° C. at which point pressure reached 50–100 atmospheres. Onset of reaction occurred after 15 minutes. Water, alone or together with a total of up to about 72 parts of acrylic acid, was then pumped in as necessary to maintain pressure at a predetermined level in the range of 50–100 atmospheres, and heating and stirring continued for 2–8 hours, after which the reactor was cooled, the pressure released, and the thick gelatinous reaction mixture dipped out of the autoclave and manually scrubbed from the autoclave walls.

The product mixture was diluted with water, and the polymer filtered off and washed thoroughly with water and methanol. Space time yields of 10–150 and usually about 50 grams per liter per hour were obtained. The polymers contained 57–66 weight percent combined tetrafluoroethylene and 0–3 weight percent of combined acrylic acid. The polymers had glass transition temperatures in the range of 15–55° C. and melting points in the range of 110–195° C.

The carboxyl-containing polymers manifested stable melt indexes in the range of 2–250. The carboxl-free polymers had similar stable melt indexes and showed no absorption peak at 2.75 microns wave length.

Example II

This illustrative example shows the effect of using an aqueous copper-accelerated, phosphate-regulated persulfate-bisulfite redox system together with an emulsifier for isobutylene at a tetrafluoroethylene/isobutylene mole ratio of about 1:1, to produce a dipolymer.

Into a nitrogen-filled, water-steam jacketed, horizontally stirred stainless steel autoclave having a working capacity of ca. 35,000 parts were charged, as a reaction medium, having a pH of 6–8:

| | Parts |
|---|---|
| Water | 19,000 |
| $Na_2HPO_4$ | 292 |
| $CF_3(CF_2)_6COONH_4$ | 192 |
| $(NH_4)_2S_2O_8$ | 200 |
| $NaHSO_3$ | 26.5 |
| $CuSO_4$ | 0.0333 |

The charge was then stirred and heated to 50° C., pressured with (1) 550–750 parts isobutylene and (2) an approximately equimolar amount of TFE, and further stirred and heated to 80° C., at which point the pressure reached 27–32 atmospheres and, after 15–25 minutes, commenced to decrease, indicating the onset of reaction. The pressure was thereafter maintained at 27–32 atmospheres during 3 to 5 hours with continued heating and stirring by periodic injection of tetrafluoroethylene and isobutylene in approximately equimolar amounts, to complete the reaction, after which the stirring rate was decreased, the reactor contents cooled, and the pressure bled down to atmospheric.

In a series of four runs, there were obtained stable fluid aqueous dispersions containing ca. 10 to 30 weight percent dispersed polymer solids, corresponding to space time yields of 50–100 grams per liter per hour. The dispersion was readily drained so as to leave a clean reactor.

The dispersed polymer was coagulated by heating with sodium chloride. The coagulated solids were filtered off, washed with water and methanol, and dried overnight in an air oven at 50° C. They contained ca. 59.5 weight percent combined tetrafluoroethylene, were undiscolored and visually homogeneous and showed crystalline melting points of 132–148° C., glass transition temperatures of 20-25° C., stable melt indexes in the range of ca. 50–360, and strong absorption at 2.75 microns wave length.

In an attempted otherwise similar run in which tetrafluoroethylene was charged before the isobutylene, reaction commenced at ca. 2 atmospheres pressure, and was killed by charging of isobutylene thereafter.

Example III

This illustrative example shows the effect of having tetrafluoroethylene and isobutylene present in mole ratio of about 2:1 at the onset of polymerization in producing a dipolymer.

The procedure of Example II was repeated except that the system was initially pressured with a 2:1 mole ratio tetrafluoroethylene/isobutylene mixture, and after the onset of reaction, an 0.8:1 mole ratio of tetrafluoroethylene/isobutylene was used to maintain pressure and the reaction continued for 1 to 2 hours.

In a series of four runs there were obtained stable fluid aqueous dispersions containing 33–34 weight percent dispersed polymer solids, corresponding to space time yields of 330 to 495 grams per liter per hour. The dispersions were readily drained leaving a clean reactor. The polymers were undiscolored, visually homogeneous and showed ca. 61 weight percent combined tetrafluoroethylene, crystalline melting points of 181–186° C., glass transition temperatures of 37–40° C., stable melt indexes in the range of 0.8 to 3.0, and strong absorption at 2.75 microns wave length.

Example IV

This example shows the effect of phosphate regulator.

Into a nitrogen-filled, horizontally stirred, water-steam jacketed, stainless steel reactor having a water capacity of ca. 7500 parts were charged:

| | Parts |
|---|---|
| Water | 2500 |
| $CF_3(CF_2)_6COONH_4$ | 8 |
| $Na_2HPO_4$ | 37.5 |
| $(NH_4)_2S_2O_8$ | 20.5 |
| $Na_2SO_3$ | 4.54 |
| $CuSO_4$ | 0.00575 |

The charged was stirred, heated to 55° C. and pressured to 28–35 atmospheres with isobutylene and ca. 1.2–2.5 moles of tetrafluoroethylene per mole of isobutylene for a period of four hours after onset of polymerization. An aqueous dispersion containing about 12 percent dispersed polymer solids was obtained, corresponding to a space time yield of ca. 30 grams of polymer per liter of water charged. The polymer, isolated by salting out, washing and drying, contained 47.1 mole percent combined tetrafluoroethylene.

In comparison, an otherwise repetitive experiment in which no phosphate was charged produced no polymer after maintaining pressure at ca. 35 atmospheres for four hours.

Example V

This example shows the effect of emulsifier kind and level.

(A) A polymerization was carried out as set forth in Example IV except that the charged comprised 3000 parts water, 10.8 parts $CF_3(CF_2)_6COONH_4$, and 48.2 parts $NaHPO_4 \cdot 7H_2O$, and the reaction temperature was 80° C. Continuing the reaction for 2.5 hours resulted in a dispersion containing 15 percent solids, corresponding to a space time yield of 68 grams per liter per hour.

(B) Repeating procedure (A) with a charge containing 32.4 parts $CF_3(CF_2)_6COONH_4$ (corresponding to ca. 1–1.5 times the critical micelle concentration) provided space time yields of 122–192 grams per liter per hour in a series of three runs of 1.3 to 1.7 hours' duration.

(C) Repeating procedure (A) except that the charge contained 12 parts of sodium lauryl sulfate as emulsifier resulted in a space time yield of 122 grams per liter per hour in a run of 2.8 hours.

(D) Repeating procedure (A) except that the charge contained 50.4 parts of "Tergitol" 4 aqueous solution containing 25 percent sodium tetradecyl sulfate as sole emulsifier provided in a space time yield of 230 grams per liter per hour in a run of 1.8 hours.

(E) Procedures similar to (A) in which (a) cetyl trimethyl ammonium bromide and (b) a fatty alcohol ethylene oxide condensation product were substituted as emulsifiers produced dispersions together with coagulum. By contrast procedures (A) to (D) resulted in dispersions containing substantially no coagulum.

Example VI

This example shows the effect of chain transfer agent and pH in an acidic terpolymer preparation, and stabilization of the resulting product.

Into a nitrogen-filled, horizontally paddle stirred, water-stream jacketed stainless steel autoclave having a water capacity of ca. 35,000 parts were charged, as a reaction medium, having a pH of ca. 3.1:

| | Parts |
|---|---|
| Distilled demineralized deoxygenated water | 19,000 |
| $NaH_2PO_4 \cdot H_2O$ | 139 |
| 85% $H_3PO_4$ | 69.5 |
| $C_{14}$ sodium alkyl sulfate ("Tergitol" 4) | 292 |
| $(NH_4)_2S_2O_8$ | 119 |
| $NaHSO_3$ | 21.6 |
| $CuSO_4$ | 0.0333 |
| Ethylbenzene | 50 |

With the stirrer at 65 r.p.m., the charge was heated to 50° C., pressured with (1) 906 parts isobutylene and (2) 2400 parts tetrafluoroethylene (TFE/IB mole ratio ca. 1.5), and further heated to 80° C. at which point the pressure reached 39 atmospheres and commenced to decrease after a few minutes, indicating the onset of reaction. Stirring and heating were continued for 5–10 minutes during which time the pressure decreased to 34 atmospheres.

The system was then repressured to 39–41 atmospheres with 455 parts of tetrafluoroethylene and 272 parts isobutylene (mole ratio 0.93) while continuing stirring and heating. At the same time, introduction of an aqueous 5 percent acrylic acid solution, containing 0.005 percent of the disodium salt of ethylene diamine tetraacetic acid, was commenced at the rate of ca. 60 parts per minute and continued until 650 parts had been added. On continued stirring and heating for a further 3–10 minutes, the pressure had again decreased to 34 atmospheres.

The procedure of the above paragraph was repeated 5 more times, requiring about 15–20 minutes per cycle, to complete the reaction. The stirring rate was then decreased to 20 r.p.m., the reactor contents cooled to 50° C., and the pressure thereafter bled down to atmospheric during ca. 30 minutes. There were obtained ca. 32,000 parts of a stable fluid dispersion having a bluish cast and containing 22.4 percent resin solids, corresponding in repeated experiments to a space time yield of 125–275 grams per liter of original reaction medium per hour. The final pH of the product dispersion was 2.1.

A sample of the dispersed polymer was coagulated by heating with sodium chloride, and isolated by filtering and washing with water and methanol and dried 6–12 hours in an air oven at 50° C. The polymer isolated was a 60.3/37.6/2.1 percent tetrafluoroethylene/isobutylene/acrylic acid terpolymer, having a melt index of 8.5, a curing rate of 1.27, a glass transition temperature of 42° C., and a melting point of 175° C.

To the balance of the dispersion were added 72 parts of calcium acetate and sufficient acetic acid to adjust the pH to 4.6. The mixture was stirred and heated to 80–90° C. for 30 minutes; 3600 parts of sodium chloride were then added and the mixture further stirred and heated until the dispersed polymer coagulated. The coaglum was filtered off, washed thoroughly with water and methanol, and dried in an air oven at 50° C. The stabilized product had a melt index of 6 and a curing rate of 0.2, and a cationic metal content corresponding to ca. 15 percent carboxyl group neutralization. The product on pressing between dichromate etched aluminum strips at 220° C. for 5 minutes (one-half inch wide, one quarter inch overlap) manifested a dry lap-shear strength of 4360 pounds per square inch (multiply by 0.0703 for kgs. per square centimeter) which decreased only to 3800 after immersion in boiling water, and did not fail under a continuous shear stress of 2000 pounds per square inch in water for 500 days.

In similar experiments adding the acrylic acid before the onset of polymerization killed the reaction; unstabilized melt index in the absence of chain transfer agent was ca. 2.0, and the glass transition temperature was ca. 10° C. lower; less than 0.5 percent acrylic acid was incorporated at an initial reaction medium pH above 5.

Example VII

This example shows further control of melt index through added chain transfer agent.

The process of the preceding example was repeated except that 75 parts of chain transfer agent were used and the specified cycle was repeated only 3 times. Dispersion was obtained at a space time yield of 104 grams per liter per hour. The unstabilized product polymer contained 61 percent combined tetrafluoroethylene, 37.3 percent combined isobutylene and 1.8 percent combined acrylic acid and had a melt index of 72.0.

Example VIII

This example shows the effect of heating hydroxylated polymer with polycarboxylic acid. Terpolymer prepared in aqueous t-butanol by the general procedure of Example I in the presence of acrylic acid and having a stable melt index of 6.5 was blended with an equal weight of dipolymer prepared by the general procedure of Example III and having a stable melt index of 99. The thoroughly blended mixture was subjected to the melt index test and showed a melt index of 13.6 as contrasted with the calculated value of 25 for a nonreactive mixture.

Example IX

This example shows the effect of various metallic cations on the melt index of a terpolymer having a melt index of 550 prepared by the general procedure of Example VII and isolated and stabilized with the indicated kind and amount, based on polymer weight, of cationic metal compound sufficient to react with one third of the total carboxyl groups of the polymer.

TABLE 1

| Compound | Percent Loading | Resulting Melt Index After 15 Minutes in Melt Indexer |
| --- | --- | --- |
| None | 0 | 550 |
| (A) $Ca(OOCCH_3)_2 \cdot H_2O$ | 1 | 86.6 |
| (B) $Zn(OOCCH_3)_2 \cdot 2H_2O$ | 1.25 | 117 |
| (C) $Al[OCH(CH_3)_2]_3$ | 0.66 | 28 |
| (D) $Cr(OOCCH_3)_2 \cdot 4H_2O$ | 0.94 | 13.8 |
| (E) $Mg(OOCCH_3)_2 \cdot 4H_2O$ | 1.22 | 76.2 |
| (F) $Pb(OOCCH_3)_2 \cdot 3H_2O$ | 2.15 | 439 |
| (G) $Co(OOCCH_3)_2 \cdot 2H_2O$ | 1.42 | 97 |
| (H) $Mn(OOCCH_3)_2 \cdot 4H_2O$ | 1.40 | 245 |
| (J) $Cu(OOCCH_3)_2 \cdot H_2O$ | 1.14 | 474 |
| (K) $KOOCCH_3$ | 1.12 | 331 |
| (L) $NaOOCCH_3$ | 0.94 | 290 |
| (M) $Ce(OOCCH_3)_2$ | 1.47 | 322 |

Example X

This example shows the effect of various cationic metal compounds on the curing rate of a polymer produced by the general procedure of Example VII and having an unmodified curing rate of 1.6. The loadings are equivalent to ca. 10 percent of the carboxyl groups. The letters refer to the compounds of the preceding example.

TABLE 2

| Loading (percent): | Curing rate |
| --- | --- |
| 0.3 (J) | 0.53 |
| 0.3 (G) | 0.34 |
| 0.5 (F) | 0.25 |
| 0.3 (D) | 0.69 |
| 0.23 (A) | 0.24 |
| 0.2 (L) | 0.17 |
| 0.3 (B) | 0.38 |

Example XI

This example shows the effect of using chain transfer agent on lap shear strengths obtained using approximately 60 different polymers. The bonds were prepared and tested by the procedures described in Example VI.

The polymers were prepared by the general procedure described in Example VI except that about half were prepared without chain transfer agent, the molecular weight of the product in the latter situation being controlled by the length of time polymerization was allowed to proceed. The polymers all contained 44 to 50 mole percent tetrafluoroethylene and 1.5 to 2.5 weight percent combined acrylic acid, and had melt indexes in the range of 2 to 60.

The polymers prepared in the absence of chain transfer agent showed average dry lap-shear strengths increasing from about 2800 pounds per square inch at 44 mole percent tetrafluoroethylene to about 3850 pounds per square inch at 48 mole percent tetrafluoroethylene, and thereafter decreasing to about 3100 pounds per square inch at 50 mole percent tetrafluoroethylene.

In contrast, the polymers prepared in the presence of chain transfer agent manifested average dry lap-shear strengths increasing from about 3600 pounds per square inch at 44 mole percent tetrafluoroethylene to about 4250 pounds per square inch at 48 mole percent tetrafluoroethylene, and decreasing to about 3800 pounds per square inch at 50 mole percent tetrafluoroethylene.

I claim:

1. The process of preparing a tetrafluoroethylene/isobutylene polymer which comprises contacting a mixture of tetrafluoroethylene and isobutylene containing more than 1 but not more than 2 moles of tetrafluoroethylene per mole of isobutylene at 50–120° C. and 20–50 atmospheres with an agitated aqueous medium having a pH of 1.5–10 and containing an emulsifier for isobutylene selected from the group consisting of ammonium salts of halogenated organic acids and alkali metal alkyl sulfates, said acid and alkyl being of 8 to 18 carbon atoms, a persulfate initiator selected from the group consisting of ammonium persulfate and alkali metal persulfates, a sulfite or bisulfite forming a redox system with said persulfate, a water-soluble copper salt accelerator for said redox system, and a water-soluble phosphate regulator for said accelerated system selected from the group consisting of phosphoric acid, mono-, di-, and tri-basic phosphates, metaphosphates, polyphosphates and citrophosphates, and after onset of polymerization charging to the reaction a mixture of tetrafluoroethylene and isobutylene containing less than 1 but not less than 0.8 mole of tetrafluoroethylene per mole of isobutylene.

2. A process according to claim 1 wherein the mole ratio of tetrafluoroethylene to isobutylene averages 0.9 to 1.1 over the course of the reaction.

3. A process according to claim 2 wherein said mole ratio is 1.4 to 2.0 at the onset of polymerization and is 0.8 to 0.95 after onset of polymerization.

4. A process according to claim 3 wherein the mixture charged after onset of polymerization contains 0.5 to 5 weight percent of acrylic acid and the pH is less than 5.

5. A process according to claim 4 in which the pH is 2 to 4.

6. A process according to claim 5 wherein the concentration of said emulsifying agent in said medium at least equals the critical micelle concentration.

7. A process according to claim 6 wherein the sulfite or bisulfite forming a redox system with said persulfate is sodium sulfite or sodium bisulfite and the copper accelerator for the redox system is copper sulfate.

8. A process according to claim 7 wherein the reaction medium contains 0.1–50 grams of persulfate ion per liter, 0.05–2 grams of sulfite ion per gram of persulfate, and 0.02–2 milligrams of dissolved copper ion per liter.

9. A process according to claim 8 wherein the total number of moles of phosphate ion is 0.5–5 times the total number of moles of persulfate, sulfite, and bisulfite charged to the reaction.

10. A process according to claim 9 wherein said medium contains a polymerization chain transfer agent selected from the group consisting of alkyl benzene or an aliphatic aldehyde.

11. A process according to claim 10 wherein the reaction medium contains, as chain transfer agent, 1–10 grams per liter of ethylbenzene.

12. A process according to claim 11 wherein said emulsifying agent is sodium tetradecyl sulfate, and is present in said medium at a concentration of 1.0 to 1.5 times the critical micelle concentration.

13. A visually homogeneous tetrafluoroethylene/isobutylene polymer of 53–67 weight percent tetrafluoroethylene and 32–44 weight percent isobutylene having a substantially alternating rather than a substantially consecutive arrangement of like monomer units in the molecule, a melt index of 1 to 4000, a glass transition temperature of 15–55° C., a crystalline melting point of 110–190° C., and containing hydroxyl groups as indicated by infrared absorption at 2.75 microns wave length and a decrease in melt index upon being heated with a melt index stable, compatible, tetrafluoroethylene/isobutylene/acrylic acid terpolymer.

14. A visually homogeneous tetrafluoroethylene/isobutylene/acrylic acid terpolymer of 53–67 weight percent tetrafluoroethylene, 33–44 weight percent isobutylene and 0.5–5 weight percent acrylic acid having a substantially alternating rather than a substantially consecutive arrangement of like monomer units in the molecule, a melt index of 1 to 4000, a glass transition temperature of 15–55° C., a crystalline melting point of 110–190° C., and containing hydroxyl groups as evidenced by spontaneous curing upon being heated under melt index conditions which results in a decrease in melt index.

15. A polymer according to claim 14 having a crystalline melting point of 150–180° C. and a glass transition temperature of 35–55° C.

16. A polymer according to claim 14 in which at least a portion of the carboxylic hydrogen is replaced by cationic metal.

17. A polymer according to claim 16 wherein 10 to 75 percent of the carboxylic hydrogen is replaced by cationic metal.

18. A polymer according to claim 17 wherein said cationic metal is polyvalent.

19. A polymer according to claim 18 wherein the polyvalent metal is calcium.

References Cited

UNITED STATES PATENTS

| 2,820,026 | 1/1958 | Passino et al. | 260—92.1 |
| 3,318,854 | 5/1967 | Honn et al. | 260—87.7 |
| 3,380,974 | 4/1968 | Stilmar | 260—80.8 |

JOSEPH L. SCHOFER, Primary Examiner

STANFORD M. LEVIN, Assistant Examiner

U.S. Cl. X.R.

161—218; 260—80.76, 80.77, 80.78, 80.81, 87.5

PO-1050
(5/69)

UNITED STATES PATENT OFFICE
CERTIFICATE OF CORRECTION

Patent No. 3,475,391        Dated October 28, 1969

Inventor(s) James N. Coker

It is certified that error appears in the above-identified patent and that said Letters Patent are hereby corrected as shown below:

Column 1, Line 35, delete "Ser.". Column 3, Line 22, "bebelow" should be -- be below --; Line 32, delete "may". Column 4, Line 11, "sulfate" should be -- sulfite --; Line 13, "generall" should be -- generally --; Line 62, "aer" should be -- are --; Line 72, "sohw" should be -- show --. Column 6, Line 30, "carboxl" should be -- carboxyl --. Column 7, Line 43, "charged" should be -- charge --; Line 62, "charged" should be -- charge --. Column 8, Line 6, delete "in". Column 12, Line 3, "33" should be -- 32 --.

SIGNED AND
SEALED
MAY 19 1970

(SEAL)
Attest:

Edward M. Fletcher, Jr.        WILLIAM E. SCHUYLER, JR.
Attesting Officer              Commissioner of Patents